United States Patent [19]

Chou

[11] Patent Number: 5,173,996
[45] Date of Patent: Dec. 29, 1992

[54] BINDING BAND TIGHTENER WITH BANDS

[76] Inventor: An-Chuan Chou, No. 212, Yung An Street, Tainan, Taiwan

[21] Appl. No.: 912,741

[22] Filed: Jul. 13, 1992

[51] Int. Cl.⁵ .............................................. A44B 21/00
[52] U.S. Cl. ............................... 24/68 CD; 24/69 CT; 254/223
[58] Field of Search ............... 24/68 CD, 68 R, 68 E, 24/69 R, 69 CT, 69 ST, 71 R, 71.2; 254/223, 250; 410/105, 110

[56] References Cited

U.S. PATENT DOCUMENTS

| 2,372,558 | 3/1945 | Dowd | 24/69 SB |
| 2,867,406 | 1/1959 | Davis | 24/68 CD |
| 4,155,537 | 5/1979 | Bronson | 254/223 |
| 4,451,956 | 6/1984 | Kawahara | 24/68 CD |
| 4,823,443 | 4/1989 | Waters | 24/68 CD |
| 5,063,641 | 11/1991 | Chuan | 24/68 CD |

FOREIGN PATENT DOCUMENTS 1297146 11/1972 United Kingdom ............ 24/68 CD

Primary Examiner—Victor N. Sakran
Attorney, Agent, or Firm—Rosenberg: Morton J.; David I. Klein

[57] ABSTRACT

A binding band tightener with bands comprising two buckles and three bands extended to go around the two buckles and overlaid on a piled packaged merchandise loaded in a truck and two of the bands being manipulated to tighten this tightener with bands and keep it immovable by the two buckles for binding tight the merchandise to prevent it from loosing and falling down from the truck in transportation.

1 Claim, 4 Drawing Sheets

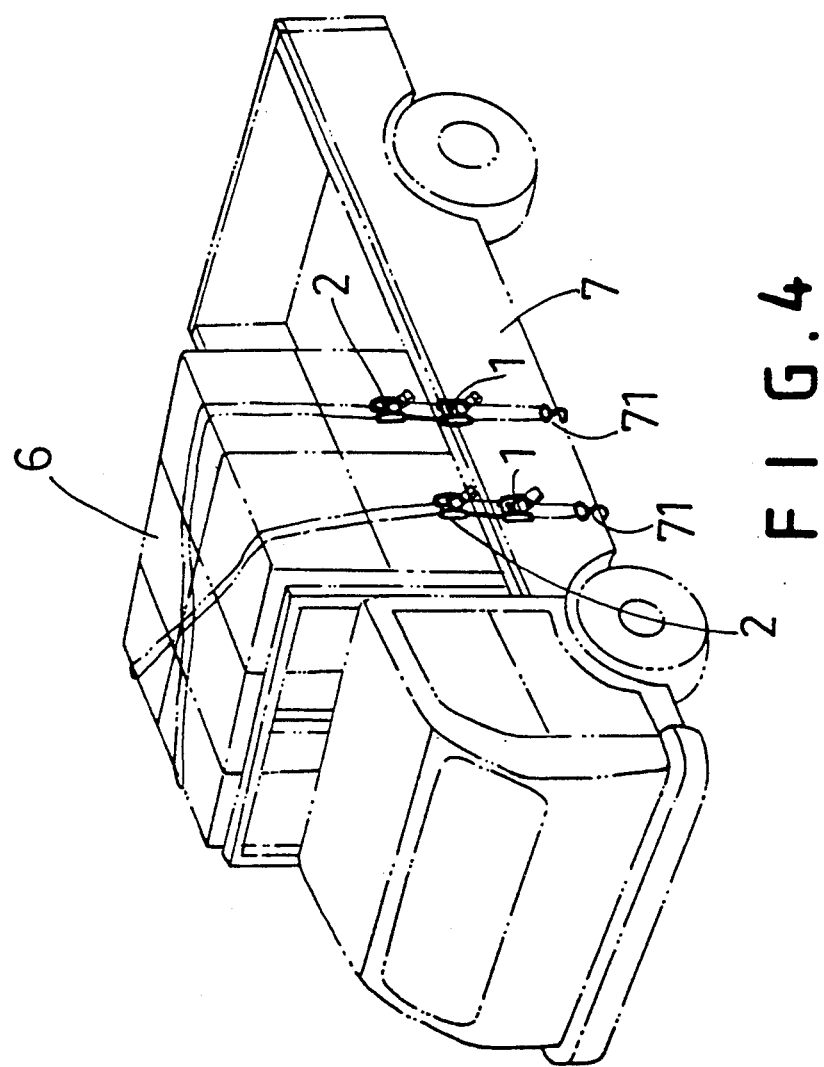

BINDING BAND TIGHTENER WITH BANDS

BACKGROUND OF THE INVENTION

A conventional rope or band for binding packaged merchandise loaded on a truck is usually a rather large diameter one or a rubber band, but only hooked on hooks of a turck. And a worker in binding should have to stop a while in pulling a rope when the rope comes to a curved corner of packages, so tightened portion of the rope may become a little loose. Besides, if packaged merchandise should be very massy, binding would take much time and labor and should binding be not so tight, some packaged merchandise might become loose and fall down if worse, in transportation.

SUMMARY OF THE INVENTION

This invention, a binding band tightener with bands, has been devised to have the following features and advantages.

1. It comprises two buckles and three bands to extend around on the two buckles to be tightened by pulling two of the three bands to bind packaged merchandise loaded on a truck.
2. Should packaged merchandise bound with this band tightener with bands be found not so tight or stabilized during transportation, the two bands could be immediately pulled further tight without necessity of rebinding.
3. The two bands can be pinched tight and immovable between projecting ridges provided in an anti-slippage rod and a ratchet teeth face in a pushing plate to prevent the bands from becoming loose.
4. In binding merchandise loaded in a truck, this tightener with bands can save time in manipulating.
5. The number of the tighteners with bands can be increased or lessened dependent on dimensions of merchandise to be bound.

BRIEF DESCRIPTION OF DRAWINGS

The invention will be better understood by reference to the accompanying drawings, wherein.

DETAILED DESCRIPTION OF THE INVENTION

Figure 1:
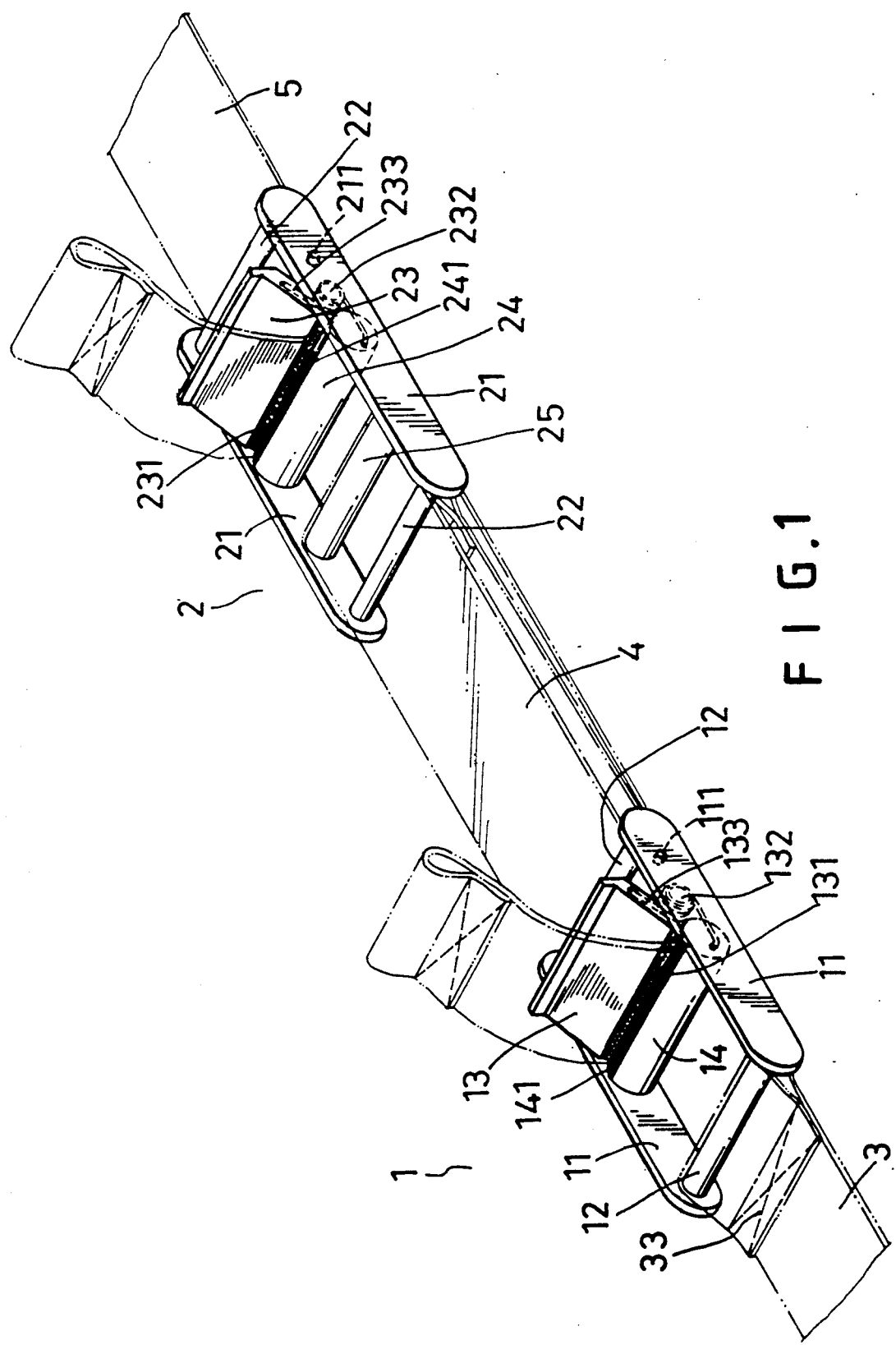
FIG. 1 is a perspective view of a binding band tightener with bands in the present invention.

A binding band tightener in accordance with the present invention, as shown in FIG. 1, comprises a front buckle 1, a rear buckle 2, and three bands 3, 4, 5.

The front buckle 1 has two parallel locating plates 11, 11, two lateral round rods 12, 12 respectively fixed between front and rear ends of the two locating plates 11, 11, a pushing plate 13 of nearly L-shaped cross-section pivotally disposed between intermediate portions of the two locating plates 11, 11 having a ratchet teeth face 131 at a lower portion to face projecting ridges 141 of an anti-slippage rod 14, a shaft 132 supporting the pushing plate 13 as a pivot and a spring 133 having twisting force disposed to have one end hooking on one end of the shaft 132 and the other end hooking on one end of the anti-slippage rod 14. A stop projection 111 is provided on an inner wall of one of the locating plates 11, 11 between the shaft 132 and one of the lateral rods 12, 12 for stopping the pushing plate 13 to prevent it from overpressing the spring 133 to break it.

The rear buckle 2 is almost of the same structure, having two parallel locating plates 21, 21, two lateral rods, 22, 22, a pushing plate 23 having ratchet teeth face 231 at a lower portion, a pivotal shaft 232 and a twisting spring 233, and a stop projection 211 for stopping the pushing plate 23, and an anti-slippage rod 24. But a supplementary lateral round rod 25 is additionally provided in the rear buckle 2 between one of the two lateral rods 22, 22 and the anti-slippage rod 24 for the band 4 to wind thereon.

The three bands 3, 4, 5 are made of an endurable strong material to be extended between the two buckles 1, 2 for binding piled-up packaged merchandise loaded in a truck.

Figure 2:
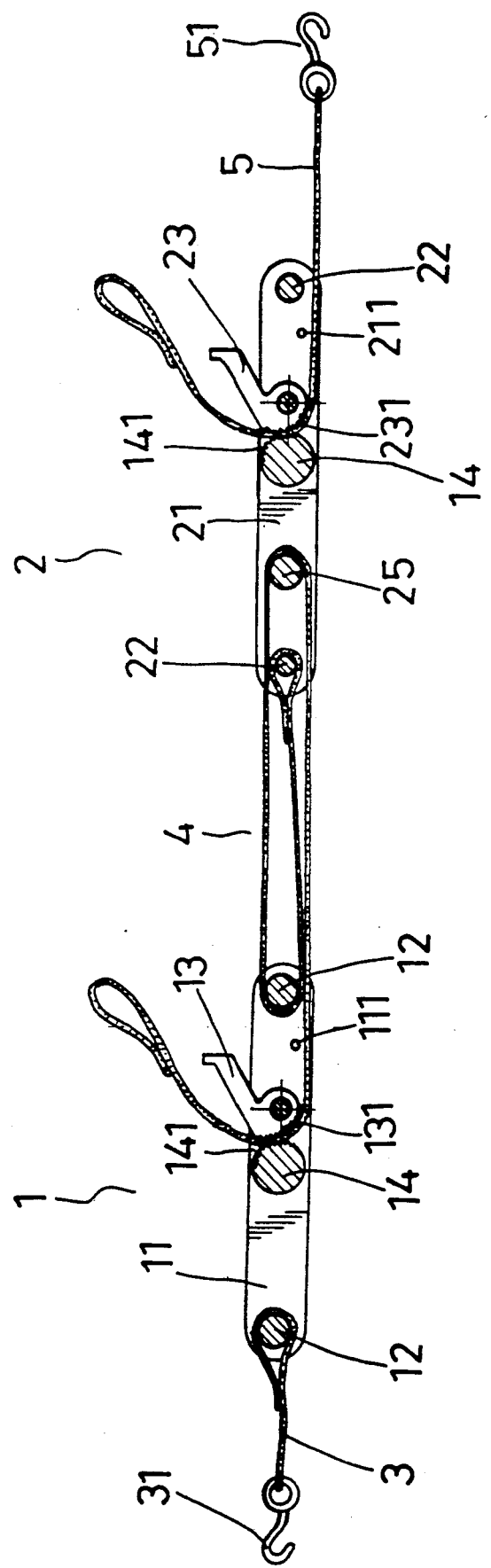
FIG. 2 is a side view of the binding band tightener with bands in the present invention.

How to arrange to extend the bands 3, 4, 5 is shown in FIG. 2. First, the band 3 has a hook 31 at one end and the other end is wound around a front lateral rod 12, and then folded and sewn together firmly with crisscross lines 33. Then one looped end of the band 4 is wound around a front lateral rod 22 of the rear buckle 2, letting the band 4 extended to wind around a rear lateral rod 12 of the front buckle 1, then to extend back to wind around the supplementary lateral rod 25 of the rear buckle 2 and then to the front buckle 1 and pass and abe stopped between the pushing plate 13 and the anti-slippage rod 14. The band 5 has one end connected with a hook 51 and the other end extending between the pushing plate 23 and the anti-slippage rod 24 and then being stopped therein pinched by the ratchet teeth face 231 and the projecting ridges 241.

Figure 3:
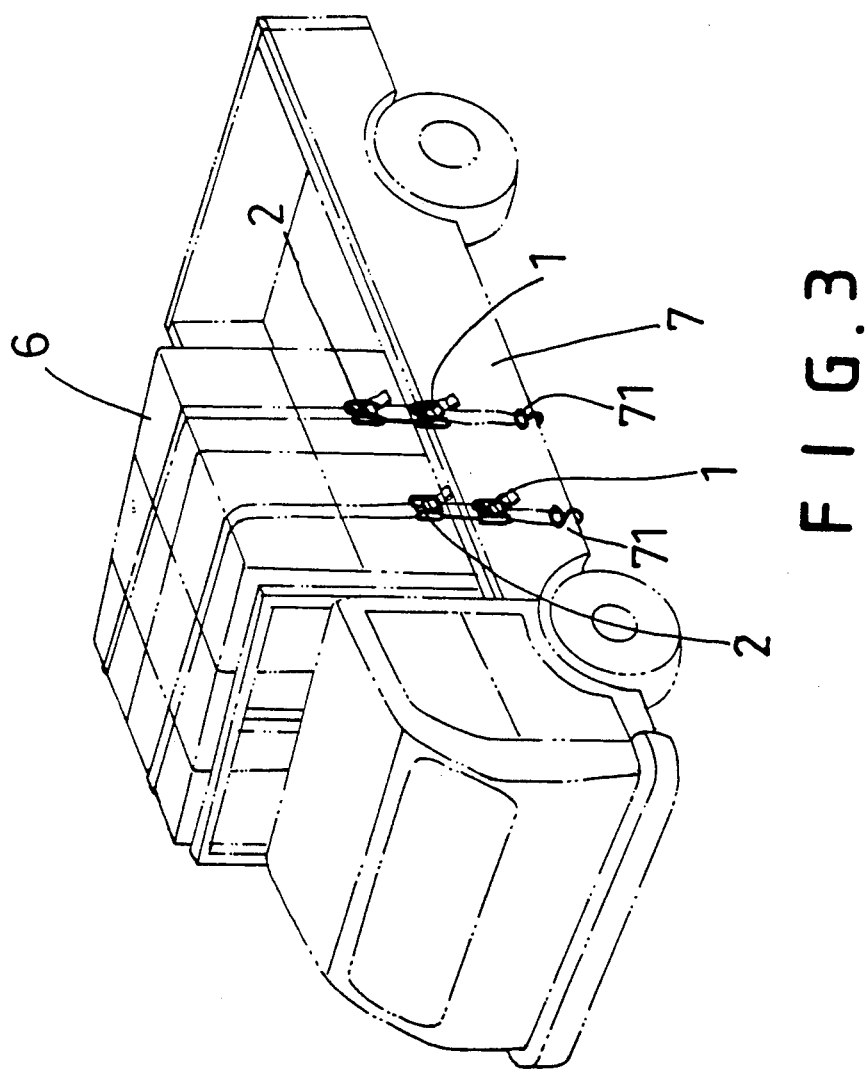
FIG. 3 is a perspective view of the binding band tightener with bands used to bind packaged merchandise loaded in a truck; and, FIG. 4 is another perspective view of the binding band tightener with bands used to bind package merchandise loaded in a truck.

In practical use, referring to FIGS. 2, 3 and 4, the hook 31 of the band 3 is to be hooked at a hook 71 or an edge of one side of a turck 7, and the hook 51 of the band 5 is also to be hooked at another hook 71 or an edge of the other side of a truck. Then the band 5 is to be overlaid on packaged merchandise piled in the truck and subsequently pulled tight by catching hold of the end of the band 5 extending through a gap between the pushing plate 23 and the anti-slippage rod 24 and lastly the pushing plate 23 is swung down to hold tightly the band 5 immovable pinched by the ratched teeth face 231 and the projecting ridges 241. The band 4 can also be used to tighten this band tightener and bands just as the band 5 is, if necessary, by pulling the end of the band 4 extending through a gap between the pushing plate 13 and the anti-slippage rod 14 and swung down the pushing plate 13 to hold tightily the band 4 by means of the ratchet teeth face 131 and the projecting ridges 141.

The number of the binding band tighteners with bands to be used for binding packaged merchandise in a truck can be lessened or increased, dependent on the volume of the merchandise to be bound. And binding methods can be parallel as shown in FIG. 3 or crisscross as shown in FIG. 4.

While the preferred embodiments of the invention have been described above, if will be recognized and understood that various modifications may be made therein and the appended claims are intended to cover all such modifications which may fall within the spirit and scope of the invention.

What is claimed is:

1. A binding band tightener with bands for binding packaged merchandise piled in a truck comprising;

a front and a rear buckle respectively having two parallel locating plates, two lateral rods laterally provided between front and rear ends of the two parallel locating plates, a pushing plate of a nearly L-shaped cross-section having a plurality of lengthwise projecting ridges on the lower portion and pivotally disposed between intermediate portions of the two parallel locating plates with a shaft as pivot, and anti-slippage rod provided near the pushing plate between the intermediate portion of the two parallel locating plates and having a ratchet teeth face facing the projecting ridges of the pushing plate, a spring disposed around one end of the pivot shaft of the pushing plate and having one end hooked on one end of the pivot shaft and the other end hooked on one end of the anti-slippage rod and a projection on an inner wall of one of the two locating plate;

three bands made of an endurable strong material, a first band having one end connected with a hook to hook on a hook of a truck and the other end folded and then wound around a front lateral rod of the front buckle and then sewn firmly together to form a loop to keep the first band on the front lateral rod, a second band having both ends respectively formed with a loop, one of the looped end winding around a front lateral rod of the rear buckle and the other looped end extending up through a gap between the pushing plate and the anti-slippage rod and then around a supplementary rod of the rear buckle and back to wind around the rear rod of the front buckle, a third band of rather long length to be overlaid on packaged merchandise piled in truck, said third band having one end connected with a hook to hook on a hook of a truck and the other end extending through a gap between the pushing plate and the anti-clippage rod and then formed with a loop; and said third band being manipulated tight over packaged merchandise loaded in a truck by pulling a free end extending up through the gap between the pushing plate and the anti-slippage rod and then the pushing plate being swung down to pinch said third band immovable between the projecting ridges and the ratchet teeth face, and said second band being also able to be manipulated tight in the same way.

* * * * *